A. G. GATES.
CUFF FASTENER.
APPLICATION FILED FEB. 16, 1910.
1,017,865.
Patented Feb. 20, 1912.
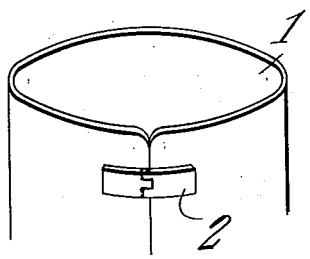
Fig. 1.
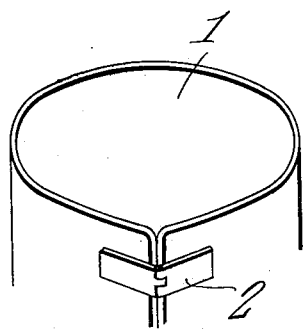
Fig. 2.
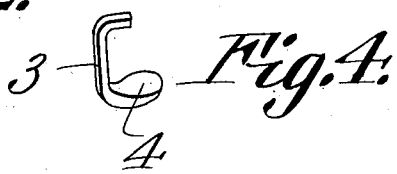
Fig. 4.
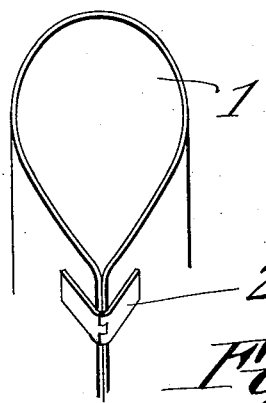
Fig. 3.
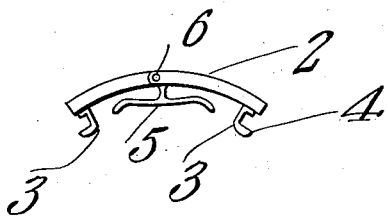
Fig. 5.
Witnesses
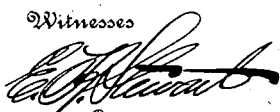
A. Easterday
Inventor
Arthur G. Gates.
By C. A. Snow & Co.
Attorneys

UNITED STATES PATENT OFFICE.

ARTHUR G. GATES, OF CHICAGO, ILLINOIS.

CUFF-FASTENER.

1,017,865. Specification of Letters Patent. Patented Feb. 20, 1912.

Application filed February 16, 1910. Serial No. 544,261.

*To all whom it may concern:*

Be it known that I, ARTHUR G. GATES, a citizen of the United States, residing at Chicago, in the county of Cook and State of Illinois, have invented a new and useful Cuff-Fastener, of which the following is a specification.

This invention has relation to cuff fasteners and it consists in the novel construction and arrangement of its parts as hereinafter shown and described.

The object of the invention is to provide a simple and secure cuff fastener adapted to hold the edges of a cuff in alinement with each other, the parts being so arranged that the fastener may be easily and quickly applied or detached from the cuff.

With the above objects in view the fastener comprises a pair of hingedly connected plates which may bear any suitable design or ornamentation upon its exterior surface and upon the underside of each of which is located a shank having oppositely disposed flattened end portions which lie approximately parallel with the plate and spaced from the same. Resilient tongues are located upon the under side of one of the plates and have their free ends disposed toward the said shanks. The edges of the cuff are received between the said tongues and the plates, and the flattened ends of the said shanks are projected through the button holes of the cuff and bear against the inner side of the cuff at the opposite edges of the button holes.

In the accompanying drawing:—Figure 1 is a perspective view of one form of the fastener applied to a cuff. Fig. 2 is a perspective view of another form of the fastener applied to a cuff. Fig. 3 is a perspective view of still another form of the fastener applied to a cuff. Fig. 4 is a perspective view of one of the shanks used upon the cuff fastener, and Fig. 5 an edge view of the fastener.

The cuff 1 may be of any usual or approved pattern. The fastener includes a plurality of plates 2 which are hingedly connected and which are of any desired configuration and bearing any appropriate ornamentation. Shanks 3 are attached to the under side of the plates 2 and are provided with laterally disposed flattened end portions 4 which are spaced from the plates 2. The shanks 3 are located in the vicinity of the opposite ends of the plates 2. Spring tongues 5 are attached to the under side of one of the plates 2 and have their free ends disposed toward the shanks 3. The major portions of the said tongues 5 are also spaced from the plate 2.

To apply the fastener to a cuff the edges of the cuff are slipped in the spaces between the free ends of the tongues 5 and the under side of the plate 2 and the shanks 3 are projected through the button holes of the cuff so that the flattened portion 4 of the said shanks bear against the inner side of the cuff. Thus it will be seen that the edges of the cuff are securely held together and the shanks 3 are so positioned upon the plate 2 that when they are projected through the buttonholes of the cuff they are in the vicinity of the outer ends of the said holes. Thus the flattened portion 4 of the said shanks 3 will bear against the intermediate portions of the cuff adjacent the said button holes. It will be noted that when the stud 4 is inserted into the button hole of a cuff and the edge of the cuff placed under the tongue, the other edge of the cuff may be readily placed under the other tongue, attention being called to the fact that the hinging of the plates permits the stud 3 to be pushed out of the way. To remove the fastener from the cuff the edge portion of the cuff is given a slight twist so that the shank 3 and the end portion 4 are disengaged from the button holes thereof when the edges of the cuff may be readily slipped from between the tongues 5 and the plate 2.

By reason of the fact that the ends of the tongues 5 terminate short of the shanks 3 and are spaced from the said shanks and the under surface of the plate 2 the edge portions of a cuff may be slipped through the spaces between the ends of the tongues 5 and the shanks 3 and the said shanks may be projected down through the button holes of the cuff and the flattened portions 4 will engage the inner sides of the cuff adjacent the edges of the button holes. And also by reason of the fact that the said tongues are spaced at their ends from the shanks the fastener may be readily removed from the cuff by drawing the cuff along the fastener until the outer end portion of the button hole is in engagement with the shank 3 when a slight lateral bend of the cuff will force the said shank out of the button hole. While the fastener is in position upon the cuff, the end portions of the tongues 5 bear against the edge portions of the cuff and hold the fastener in close contact with the edge portions of the cuff.

Having described the invention what I claim as new and desire to secure by Letters-Patent is:

A cuff fastener consisting of a plurality of hingedly connected plates, shanks mounted adjacent the ends of said plates, said shanks having their ends disposed in opposite directions, said ends being enlarged and formed with a flat surface, a standard supported by one of said plates, a plurality of oppositely disposed tongues formed integral with said standard, said tongues having off-set end portions, said tongues being spaced from said plates and terminating short of said shanks.

In testimony that I claim the foregoing as my own, I have hereto affixed my signature in the presence of two witnesses.

ARTHUR G. GATES.

Witnesses:
F. EMORY LYON,
W. M. SUTHERLAND.

Copies of this patent may be obtained for five cents each, by addressing the "Commissioner of Patents, Washington, D. C."